United States Patent

[11] 3,542,332

| [72] | Inventors | Alain A. Chevalier<br>11307 Mystery Drive, 78216;<br>Edgar R. Wilhoit, 527 E. Palfrey, San Antonio, Texas 78223 |
|---|---|---|
| [21] | Appl. No. | 778,199 |
| [22] | Filed | Nov. 22, 1968 |
| [45] | Patented | Nov. 24, 1970 |

[54] AIR OPERATED POPPET SEAT VALVE
6 Claims, 5 Drawing Figs.

[52] U.S. Cl. .................................................. 251/63.6,
251/62. 251/367; 92/169
[51] Int. Cl. .................................................. F16k 31/12
[50] Field of Search ........................................... 251/63.5,
63.6, 62, 367; 92/169

[56] References Cited
UNITED STATES PATENTS

| 2,840,337 | 6/1958 | Sasserson et al. | 251/367X |
| 3,226,078 | 12/1965 | Anderson | 92/169X |

FOREIGN PATENTS

| 173,471 | 11/1960 | Sweden | 251/62 |

Primary Examiner—Arnold Rosenthal
Attorney—John C. Stahl

ABSTRACT: An air operated poppet seat valve consisting of a body of desired configuration to which an air chamber detachably connects. A cup in said air chamber is spring biased whereby the valve is in either normally open or normally closed condition. A source of air or other gas supplied to the opposite side of the said cup at a pressure sufficiently great to overcome the force exerted by the spring causes the valve to close or open, respectively.

Patented Nov. 24, 1970

ALAIN A. CHEVALIER
EDGAR R. WILHOIT
INVENTORS

BY John C. Stahl

ATTORNEY

Patented Nov. 24, 1970

3,542,332

ALAIN A. CHEVALIER
EDGAR R. WILHOIT
INVENTORS

BY John C. Stahl

ATTORNEY

3,542,332

AIR OPERATED POPPET SEAT VALVE

The present invention relates to normally open or normally closed, air operated, poppet seat valves and more particularly to such valves wherein a source of air or other gas acting on a spring biased valve assembly causes to said assembly to close or open, respectively.

An object of the present invention is to provide an air operated poppet seat valve wherein a small force is required to move the valve to either open or closed position.

Another object is to provide such a valve which is simple to repair and easy to maintain in operative condition.

Still another object is the provision of a valve which may be operated from a remote location.

A final object of the present invention is the provision of such a valve which is inexpensive to manufacture, capable of mass production techniques and universal in its adaptability.

Other objects and features of the invention will become apparent to those skilled in the art as the disclosure is made in the following detailed description of preferred embodiments of the invention as illustrated in the accompanying sheets of drawing in which.

Figure 1:
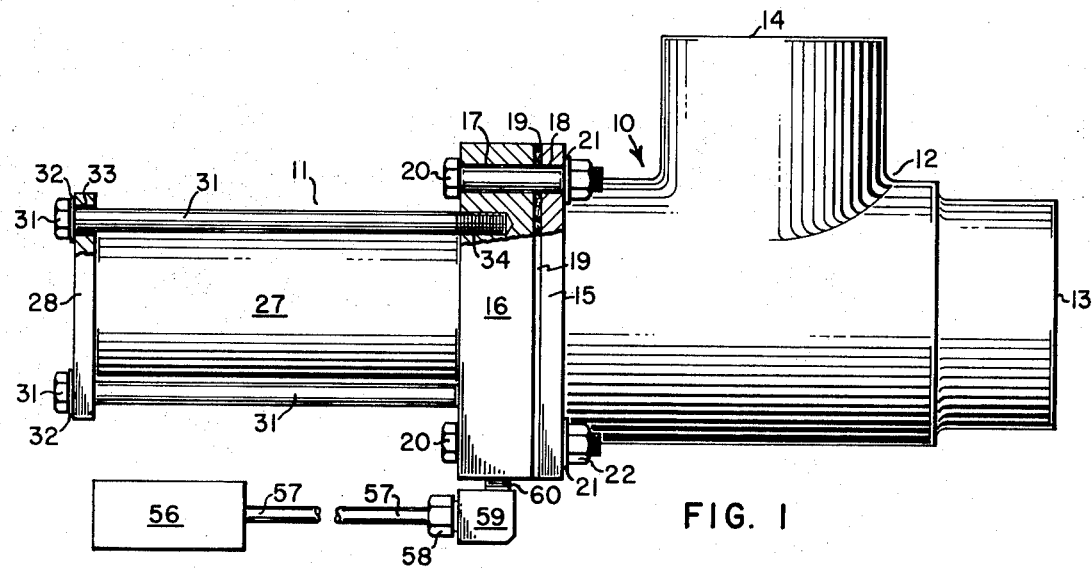
FIG. 1 is a side elevational view, partly broken away and partly in section, of the preferred embodiment of the subject invention.
Figure 2:
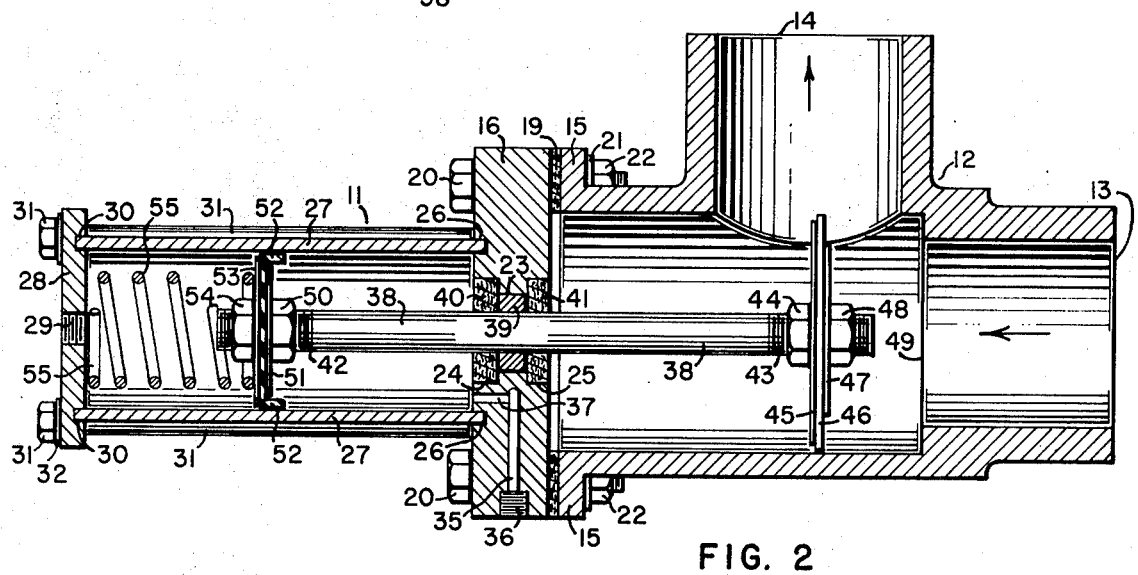
FIG. 2 is a slightly enlarged, vertical sectional view taken along the longitudinal axis of the normally closed valve of FIG. 1.

Referring now to the drawings, wherein like reference characters designate like or corresponding parts throughout the several views, there is shown in FIGS. 1 and 2 a preferred embodiment of the air operated, poppet seat valve 10 of the subject invention, consisting in general of air chamber 11 of unitary construction which detachably connects to tubular body 12 of desired configuration.

Body 12 is preferably a T-shaped casting of metallic, plastic or ceramic composition and includes inlet 13 and outlet 14, the said outlet is perpendicular to the longitudinal axis of valve 10. It is to be understood that inlet 13 and outlet 14 may either be internally or externally threaded to receive a pipe or other conduit. The end of body 12 opposite to inlet 13 and axially alined therewith includes an integrally formed and transversely extending flange 15; alternatively, a plurality of spaced and outwardly extending lugs or the like may be utilized, the purpose of which will hereinafter be described.

Referring now to FIG. 2 of the drawings, air chamber 11 terminates at one end in a transversely extending base plate 16; a plurality of peripherally spaced bores 17 (see FIG. 1) which parallel the longitudinal axis are alined with corresponding bores 18 in flange 15. Gasket 19 is positioned intermediate flange 15 and plate 16; bolts 20 are passed through the said bores 17, 18 with washers 21 and nuts 22 placed thereon outwardly of flange 15. A central, longitudinally-extending bore 23 passes through end plate 16 with each end thereof enlarged to slightly greater diameter to form seats 24 and 25.

Annular groove 26 in the inner face of plate 16, coaxial with seat 24, receives one end of cylinder 27 which inserts therein and in airtight fit or may be sealed therein by means of a gasket. End plate 28, spaced outwardly of and paralleling plate 16, includes an air vent which preferably is centrally positioned and provided with female threads 29. Annular groove 30 in the inner face of plate 28 receives the opposite end of cylinder 27 in the manner heretofore mentioned. A plurality of peripherally spaced screws 31 carrying lock washers 32 pass through bores 33 in plate 28 and insert into female threads 34 in the inner face of base plate 16.

As best seen in FIG. 2 of the drawings, base plate 16 further includes a radially extending bore 35 terminating in an enlarged, internally threaded socket 36; bore 37 communicates with bore 35 and surfaces in the inner face of plate 16 intermediate seat 24 and annular groove 26.

Valve stem 38 passes through bushing 39 conventionally secured in bore 23; resilient gaskets 40 and 41 or the like are retained in seats 24, 25 laterally of the said bushing and provide a seal for the said valve stem. Each end of valve stem 38 includes male threads, indicated by reference numerals 42 and 43. Compression nut 44 is placed on threads 43 followed by backing plate 45, washer or gasket 46 of desired composition, plate 47 of reduced diameter and compression nut 48. Plate 47 is slightly smaller than the internal diameter of inlet 13; when the valve stem assembly is forced to the right, in a manner hereinafter to be described, washer 46 bears against transversely extending seat 49 provided in body 12 in proximity to inlet 13 thereby interrupting flow through the valve.

Compression nut 50 is placed upon threads 42 on the opposite end of stem 38 followed by plate 51, internally opening cup 52 of desired composition which snugly inserts into cylinder 27, backing plate 53 and compression nut 54, respectively. Preferably backing plate 53 is slightly greater in diameter than plate 51. The ends of compression spring 55 bear against plates 28, 53 maintaining gasket 46 against seat 49 and the valve thus formed is in normally closed condition.

A source 56 of pressurized air or other gas is connected by means of pipe 57, coupling 58, ell 59 and nipple 60 to socket 36. Activation of source 56, either in close proximity to or in a location remote to said valve, permits such pressurized air or other gas to pass through bores 35, 37 against cup 52. When such pressure is sufficiently great to overcome the force exerted by compression spring 55, the valve stem assembly is forced to the left thereby unseating washer 46 from seat 49 and permitting flow from inlet 13 to outlet 14.

Figure 3:
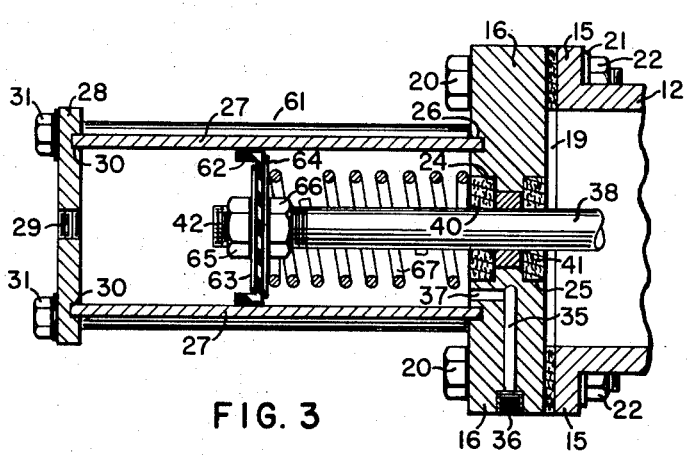
FIG. 3 is a fragmentary, slightly enlarged, vertical sectional view of another embodiment of air chamber utilized in the practice of the subject invention.

There is shown in FIG. 3 of the drawings a modification of the air chamber of the subject invention. More particularly, chamber 61 is to be secured to body 12 in the manner heretofore described to form a normally open valve. In such embodiment, outwardly opening cup 62 which snugly inserts into cylinder 27 is placed on one end of stem 38 intermediate plates 63 and 64 and secured by means of compression nuts 65 and 66, respectively. The ends of compression spring 67 carried on stem 38 but plates 16, 64. A source of pressurized air or gas (not shown) connects to threads 29 and when a sufficient pressure is applied to cup 62 to overcome the force exerted by spring 67, the valve assembly thus formed is forced to the right, thereby closing the valve. In such modification, bores 35, 37 communicating with the chamber formed between plates 16, 64 acts as an air vent or the like therefor. It is to be understood that an additional source of pressurized air or gas may be connected to threads 29 in the embodiment of FIG. 2 and to socket 36 in the embodiment of FIG. 3 to coact with compression springs 55, 67 respectively.

Figure 4:
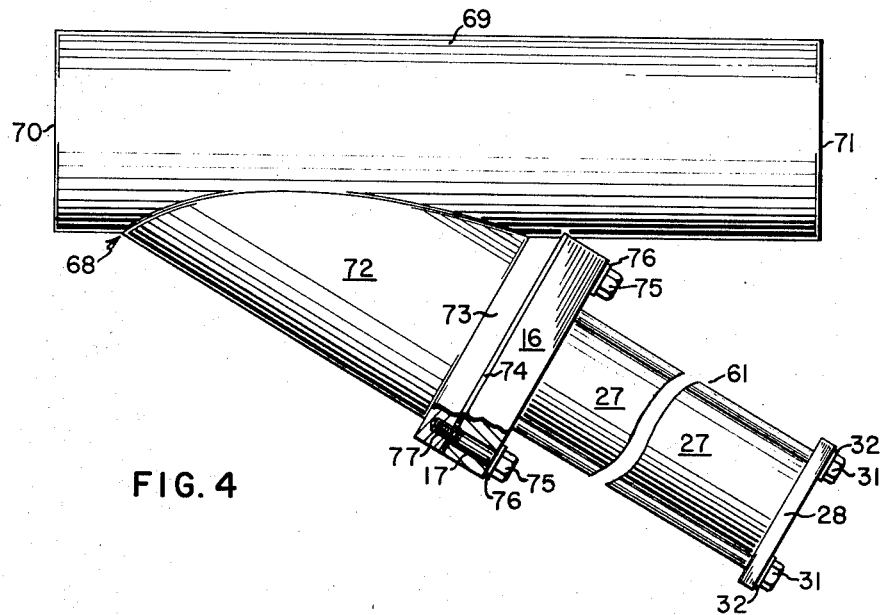
FIG. 4 is a side elevational view, partly broken away and partly in section, of another embodiment of the invention.
Figure 5:
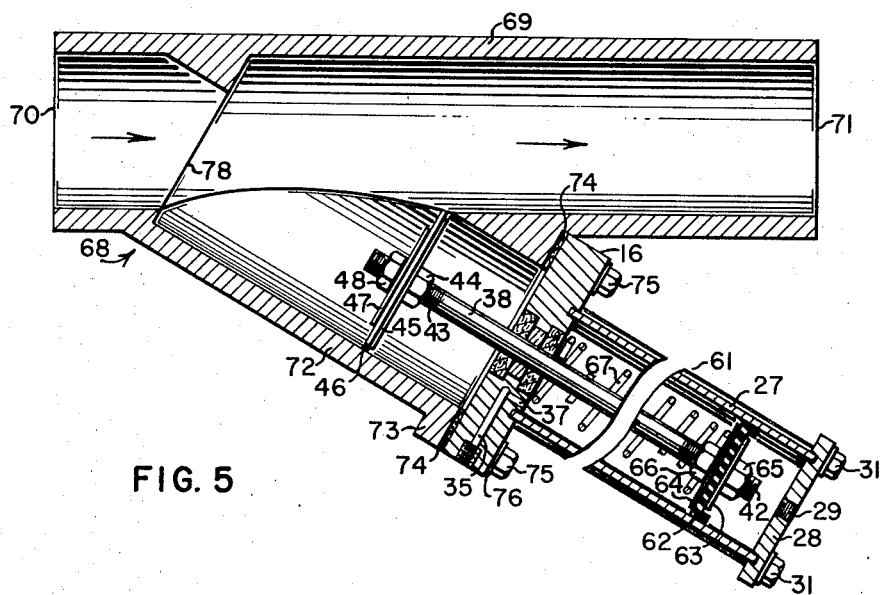
FIG. 5 is a vertical sectional view taken along the longitudinal axis of the embodiment of FIG. 4 illustrating a normally open valve.

There is shown in FIGS. 4 and 5 of the drawings a valve 68 constructed in accordance with the principles of the invention, the said valve consisting of body 69 to which air chamber 11 of FIGS. 1 and 2 or air chamber 61 of FIG. 3 of the drawings is detachably secured. More particularly, body 69 is tubular in form with inlet 70 and outlet 71 preferably in axial alinement. Integrally formed lower body portion 72 extends angularly downward at an acute angle and terminates in transversely extending flange 73. Air chamber 61 heretofore described in detail in connection with FIG. 3 of the drawings is detachably secured to flange 73 of the said valve with gasket 74 positioned intermediate plate 16 and flange 73, respectively. A plurality of peripherally spaced screws 75 with lock washers 76 placed thereon are passed through bores 17 in plate 16 and screwed into alined female threads 77 (see FIG. 4). It is to be understood that air chamber 11 may be detachably secured to flange 73 in like manner and operates in the manner heretofore described in connection with FIGS. 1 and 2 of the drawings to form a normally closed valve.

Valve stem 38 which terminates at one end in male threads 42 accommodates compression nut 65, backing plate 63, outwardly opening cup 62, plate 64 and compression nut 66, respectively. Compression spring 67 carried on stem 38 bears against plates 16, 64 and forces the valve stem assembly to the right, as viewed in FIG. 5. Male threads 43 upon the opposite end of the said valve stem accommodate compression nut 44, plate 45, washer 46 of desired composition, plate 47 of reduced diameter and compression nut 48, respectively. Transversely extending and angularly inclined seat 78 is provided in body 69 in proximity to inlet 70; plate 47 is slightly smaller than the internal diameter of seat 78 whereby washer 46 may bear against the said seat in a positive closing action.

A source of pressurized air or other gas (not shown) may be connected to threads 29 of the said air chamber. When the force exerted by such source overcomes the force exerted by spring 67, the valve stem assembly is forced to the left thereby seating washer 46 and interrupting the flow from inlet 70 to outlet 71. Bores 35, 37 act as an air vent or the like for the chamber formed between plates 16, 64.

It is to be understood that an additional source of pressurized air or other gas may be connected in such a manner to act upon the opposite side of cups 52, 62 respectively to coact with springs 55, 67 in their respective actions.

We claim:
1. An air operated poppet seat valve comprising:
 a tubular body including an inlet, an outlet, and an opening opposite to and axially alined with said inlet;
 a seat for said poppet in said body in proximity to said inlet;
 an air chamber including a base plate;
 said base plate detachably secured over said opening in said body opposite to said inlet;
 a longitudinally extending bore passing through said base plate;
 a bushing secured in said bore;
 first and second seats in said base plate coaxial with said bore;
 first and second resilient seals secured in said first and second seats respectively;
 an annular groove in said base plate coaxial with said first seat;
 an elongated valve stem passed through said first seal, bushing and second seal;
 said valve stem having first and second ends;
 an end plate spaced from and parallel to said base plate;
 a bore in said end plate;
 an annular groove in said end plate;
 a cylinder having first and second ends;
 said first end of said cylinder inserted into said groove in said end plate in an air tight seal;
 said second end of said cylinder inserted into said groove in said base plate in an air tight seal;
 means securing said end plate to said base plate;
 a cup in tight fitting relationship in said cylinder secured to the first end of said valve stem;
 a spring bearing against said cup;
 a poppet secured to the second end of said valve stem;
 a bore in said base plate having first and second openings;
 said first opening terminating intermediate said first seat and said annular groove; and
 a source of compressed air connected to said air chamber.
2. The invention of claim 1 wherein said spring is intermediate said cup and said end plate, and said source of compressed air connects to said second opening in said base plate.
3. The invention of claim 1 wherein said spring is carried by said valve stem intermediate said cup and said base plate, and said source of compressed air connects to said bore in said end plate.
4. An air operated poppet seat valve comprising:
 a tubular body having an inlet and an outlet in axial alinement and an integrally formed and downwardly depending portion;
 said portion at an acute angle relative to the longitudinal axis of the body;
 said portion terminating in a transversely extending flange;
 a seat for said poppet in said body in proximity to said inlet;
 an air chamber including a base plate;
 said base plate detachably secured to said flange;
 a longitudinally extending bore passing through said base plate;
 a bushing secured in said bore;
 first and second seats in said base plate coaxial with said bore;
 first and second resilient seals secured in said first and second seats respectively;
 an annular groove in said base plate coaxial with said first seat;
 an elongated valve stem passed through said first seal, bushing and second seal;
 said valve stem having first and second ends;
 an end plate spaced from and paralleling said base plate;
 a bore in said end plate;
 an annular groove in said end plate;
 a cylinder having first and second ends;
 said first end of said cylinder inserted into said groove in said end plate in an air tight seal;
 said second end of said cylinder inserted into said groove in said base plate in an air tight seal;
 means securing said end plate to said base plate;
 a cup in tight fitting relationship in said cylinder and secured to the first end of said valve stem;
 a spring bearing against said cup;
 a poppet secured to the second end of said valve stem;
 a bore in said plate having first and second openings;
 said first opening terminating intermediate said first seat and said annular groove; and
 a source of compressed air connected to said air chamber.
5. The invention of claim 4 wherein said spring is intermediate said cup and said end plate, and said source of compressed air connects to said second opening in said base plate.
6. The invention of claim 4 wherein said spring is carried by said valve stem intermediate said cup and said base plate, and said source of compressed air connects to said bore in said end plate.